United States Patent
Kim et al.

(10) Patent No.: US 9,865,219 B2
(45) Date of Patent: Jan. 9, 2018

(54) LIQUID CRYSTAL DISPLAY DEVICE WITH AN INTEGRATED TOUCH PANEL AND METHOD OF DRIVING THE SAME

(71) Applicant: LG Display Co., Ltd., Seoul (KR)

(72) Inventors: CheolSe Kim, Daegu (KR); HoonBae Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 9 days.

(21) Appl. No.: 13/887,507

(22) Filed: May 6, 2013

(65) Prior Publication Data

US 2013/0293498 A1 Nov. 7, 2013

(30) Foreign Application Priority Data

May 7, 2012 (KR) .................... 10-2012-0048250

(51) Int. Cl.
| | | |
|---|---|---|
| *G06F 3/041* | (2006.01) | |
| *G09G 3/36* | (2006.01) | |
| *G06F 3/044* | (2006.01) | |
| *G02F 1/1343* | (2006.01) | |

(52) U.S. Cl.
CPC ..... *G09G 3/3696* (2013.01); *G02F 1/134309* (2013.01); *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 5,592,197 A | * | 1/1997 | Tagawa .................... 345/173 |
| 2007/0126687 A1 | | 6/2007 | Choi |
| 2009/0135158 A1 | * | 5/2009 | Takahashi .............. G06F 3/044 |
| | | | 345/174 |
| 2010/0001973 A1 | * | 1/2010 | Hotelling ............ G02F 1/13338 |
| | | | 345/174 |

(Continued)

FOREIGN PATENT DOCUMENTS

| | | |
|---|---|---|
| CN | 1991448 A | 7/2007 |
| KR | 2007-0077975 A | 7/2007 |

(Continued)

OTHER PUBLICATIONS

Office Action dated Dec. 1, 2014, issued by the State Intellectual Property Office of China in Chinese Patent Application No. 201310162763.1.

*Primary Examiner* — Carolyn R Edwards
*Assistant Examiner* — Bipin Gyawali
(74) *Attorney, Agent, or Firm* — Morgan, Lewis & Bockius LLP

(57) ABSTRACT

Disclosed is an LCD device and a method of driving the same. The LCD device includes a liquid crystal panel configured to comprise a TFT substrate and a color filter substrate; a touch panel configured to comprise a plurality of driving electrodes and a plurality of receiving electrodes; a common voltage generator configured to generate a common voltage; a touch sensing unit configured to supply the common voltage to the driving electrodes and sequentially supply a driving voltage to scanned driving electrodes, corresponding to scanned gate lines to which a scan signal has been inputted for one frame period, to detect a touch; and a driving voltage generator configured to generate the driving voltage.

19 Claims, 7 Drawing Sheets

(56) References Cited

U.S. PATENT DOCUMENTS

| | | | |
|---|---|---|---|
| 2010/0238134 A1* | 9/2010 | Day et al. ..................... | 345/174 |
| 2010/0328259 A1* | 12/2010 | Ishizaki .................. | G06F 3/044 |
| | | | 345/174 |
| 2011/0025635 A1 | 2/2011 | Lee | |
| 2011/0109568 A1* | 5/2011 | Wu et al. ....................... | 345/173 |
| 2011/0316809 A1* | 12/2011 | Kim ...................... | G06F 3/0412 |
| | | | 345/174 |
| 2012/0242597 A1* | 9/2012 | Hwang ................. | G06F 3/0412 |
| | | | 345/173 |
| 2013/0057512 A1* | 3/2013 | Lillie ..................... | G06F 3/044 |
| | | | 345/174 |
| 2013/0285952 A1* | 10/2013 | Huang ................. | G09G 3/3611 |
| | | | 345/173 |

FOREIGN PATENT DOCUMENTS

| | | |
|---|---|---|
| KR | 10-2008-0047332 A | 5/2008 |
| TW | 200723221 A | 6/2007 |

\* cited by examiner (a)

(b)

(c)

(a) Normal LCD (b) Hybrid In-cell

US 9,865,219 B2

LIQUID CRYSTAL DISPLAY DEVICE WITH AN INTEGRATED TOUCH PANEL AND METHOD OF DRIVING THE SAME

CROSS-REFERENCE TO RELATED APPLICATIONS

This application claims the benefit of the Korean Patent Application No. 10-2012-0048250 filed on May 7, 2012, which is hereby incorporated by reference as if fully set forth herein.

BACKGROUND

Field of the Invention

The present invention relates to a Liquid Crystal Display (LCD) device, and more particularly, to an LCD device having a built-in touch panel and a method of driving the same.

Discussion of the Related Art

LCD devices adjust the light transmittance of liquid crystal with an electric field to display an image. To this end, the LCD devices include a liquid crystal panel in which a plurality of pixels are arranged in a matrix type, and a driver for driving the liquid crystal panel.

Methods, which input a control signal into an electronic product with LCD devices mounted thereon, include a method using a touch panel and a method using buttons. Recently, the method using the touch panel is widely used.

LCD devices with a touch panel mounted thereon are being applied to various electronic products such as navigations, industrial terminals, tablet PCs, smart phones, financial automation equipments, game machines, etc. Also, the LCD devices are being expanded in application because all users can easily manipulate the LCD devices with touch screen.

FIG. 1 is an exemplary diagram for describing a related art method of driving a touch panel. FIG. 2 is an exemplary diagram illustrating various types of LCD devices with a touch panel. A touch panel shown in a portion (a) of FIG. 2 is an on-cell type, a touch panel shown in a portion (b) of FIG. 2 is an in-cell type, and a touch panel shown in a portion (c) of FIG. 2 is a hybrid in-cell type. In FIG. 2, reference numeral 31 is a TFT substrate, reference numeral 32 is a color filter substrate, reference numeral 33 is a liquid crystal layer, and reference numeral 34 is glass.

A touch panel 40 detects a touch generated by a user. Touch panels may be categorized into a resistive type, a capacitive type, etc. Hereinafter, however, a capacitive type touch panel will be described.

A touch panel 40 includes a driving electrode 11 to which a driving voltage is applied and a receiving electrode 21 receiving a sensing signal generated by a driving voltage. A touch sensing unit 60 includes a driving voltage generator 61 applying a driving voltage to the driving electrode 11 and a sensing signal receiver 62 determining whether there is a touch by using a sensing signal received through the receiving electrode 21.

A touch panel 40 may be formed in various types depending on a disposed position.

First, as shown in a portion (a) of FIG. 2, the touch panel 40 may be adhered to an upper end surface of a color filter substrate 32, namely, the touch panel may be configured in an on-cell type.

Second, as shown in a portion (b) of FIG. 2, two electrodes 11 and 21 configuring a touch panel 40 may be formed on the same layer of a TFT substrate 31 configuring a LCD device, namely, the touch panel 40 may be configured in an in-cell type.

Third, as shown in a portion (c) of FIG. 2, one of two electrodes 11 and 21 configuring the touch panel 40 may be formed in the TFT substrate 31 of the LCD device, and the other may be formed in an upper end surface of a color filter substrate 32, namely, the touch panel 40 may be configured in a hybrid in-cell type. That is, the hybrid in-cell type touch panel may be configured by a combination of the on-cell type and the in-cell type. One of two electrodes 11 and 21 configuring the hybrid in-cell type touch panel may be used as a common electrode.

FIG. 3 is various waveform diagrams illustrating an image display period and a touch sensing period in a related art LCD device.

A portion (a) of FIG. 3 shows an image display period in a normal LCD device with no touch panel. A waveform shown in the portion (a) of FIG. 3 may be a vertical sync signal Vsync. In this case, one frame period includes an image display period (display) for which an image is outputted and a blank period for which an image is not outputted.

A portion (b) of FIG. 3 shows an image display period and a touch sensing period in the LCD device (hereinafter referred to as "hybrid in-cell type LCD device") with the hybrid in-cell type touch panel built therein. As shown in the portion (b) of FIG. 3, in the hybrid in-cell type LCD device, at least one of the two electrodes configuring the touch panel is used as the common electrode, and thus, an image output operation and a touch sensing operation cannot simultaneously be performed. Therefore, as shown in the portion (b) of FIG. 3, one frame period includes an image display period (display) and a touch sensing period (touch).

When a LCD device is driven at a frequency of 60 Hz, one frame period is set to a time of 16.7 ms. Therefore, as resolution and a size of a liquid crystal panel increase, a driving period for one channel becomes relatively shorter. In this case, an image output function and a touch sensing function can be degraded in performance due to an insufficient charging time.

That is, as shown in the portion (b) of FIG. 3, in the hybrid in-cell type LCD device, it is required to divide the image display period and the touch sensing period. Therefore, as a size of the liquid crystal panel increases, the number of channels increases, and thus, the image output function and the touch sensing function can be degraded in performance.

SUMMARY

Accordingly, the present invention is directed to provide an LCD device and a method of driving the same, which substantially obviate one or more problems due to limitations and disadvantages of the related art.

An aspect of the present invention is directed to provide an LCD device and a method of driving the same, which sequentially drive a plurality of driving electrodes for sensing a touch at a certain time interval from a driving period of a plurality of gate lines when the gate lines are being sequentially driven.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device including: a liquid crystal panel configured to comprise a TFT substrate and a color filter substrate which are coupled to each other with a liquid crystal layer therebetween; a touch panel configured to comprise a plurality of driving electrodes formed in parallel to a plurality of gate lines formed in the liquid crystal panel and a plurality of receiving electrodes formed on the driving electrodes with an insulation layer therebetween, and detect a touch, at least one of a first group consisting of the driving electrodes and a second group consisting of the receiving electrodes being formed in the TFT substrate or the color filter substrate; a common voltage generator configured to generate a common voltage; a touch sensing unit configured to supply the common voltage to the driving electrodes and sequentially supply a driving voltage to scanned driving electrodes, corresponding to scanned gate lines to which a scan signal has been inputted for one frame period, to detect a touch; and a driving voltage generator configured to generate the driving voltage.

To achieve these and other advantages and in accordance with the purpose of the invention, as embodied and broadly described herein, there is provided a method of driving a LCD device including: supplying a common voltage to driving electrodes formed in parallel to gate lines in a liquid crystal panel; and sequentially supplying a driving voltage to scanned driving electrodes of the plurality of driving electrodes, corresponding to scanned gate lines to which a scan signal has been inputted for one frame period, to detect a touch while the common voltage is supplied to the driving electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
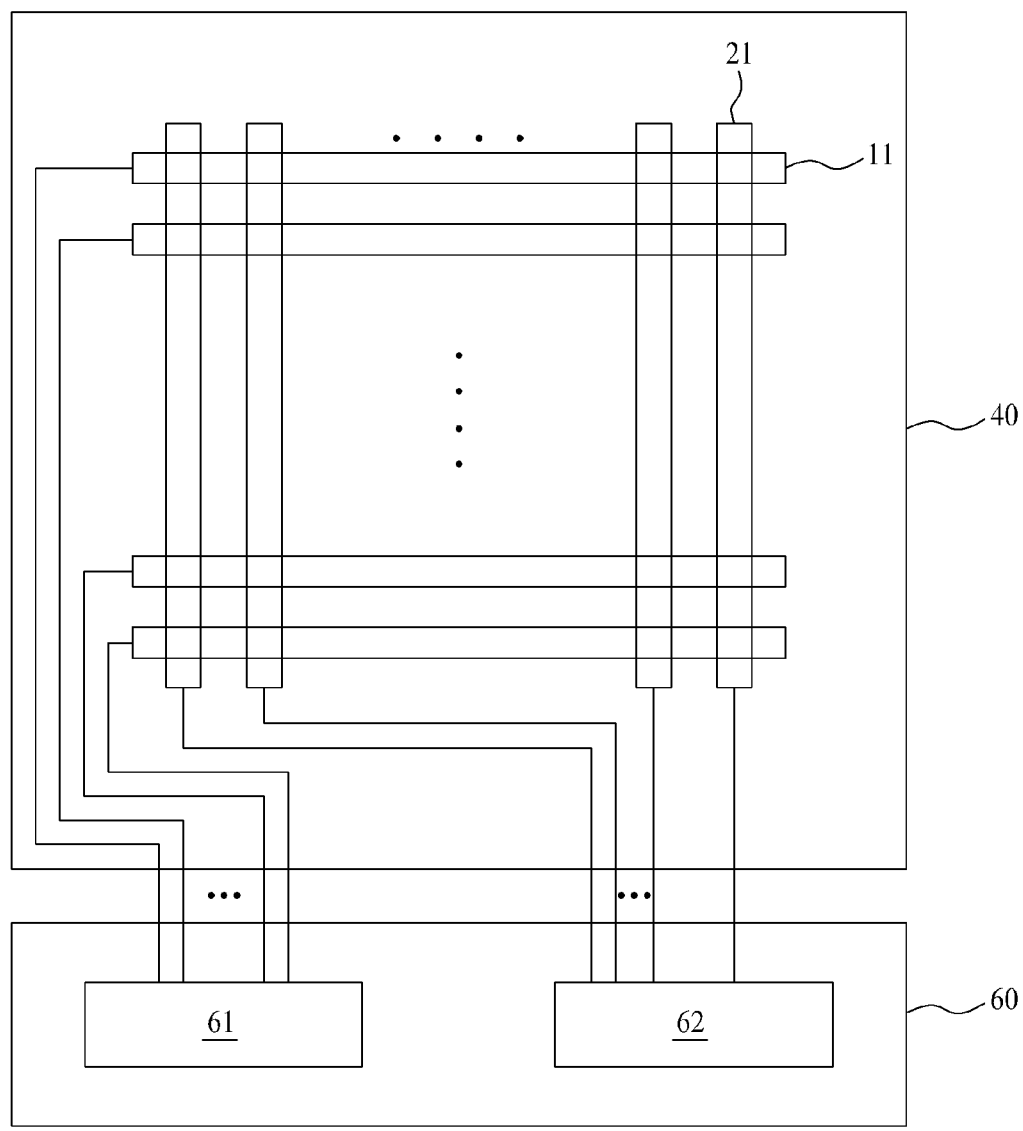
FIG. 1 is an exemplary diagram for describing a related art method of driving a touch panel.
Figure 2:
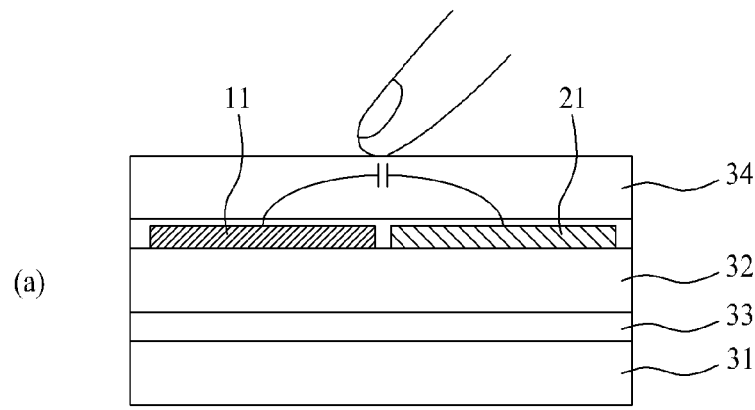
FIG. 2 is an exemplary diagram illustrating various types of LCD devices with a touch panel.
Figure 2:
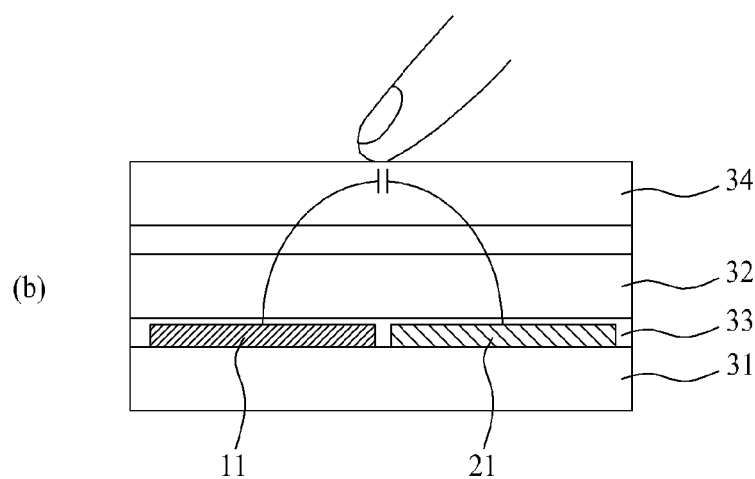
Figure 2:
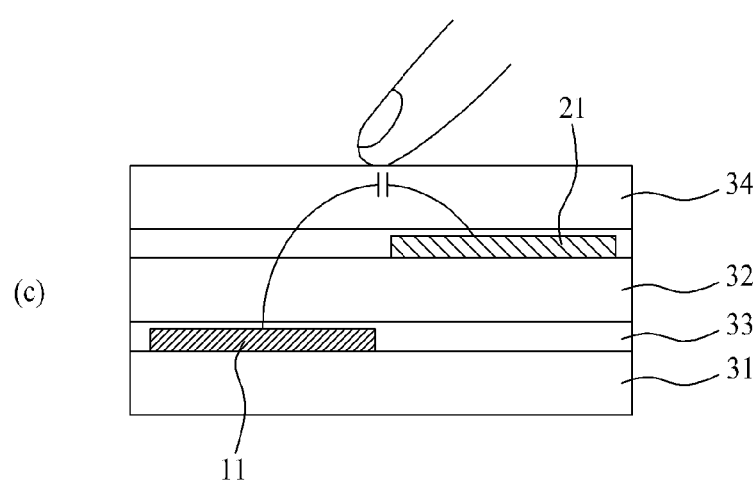
Figure 3:
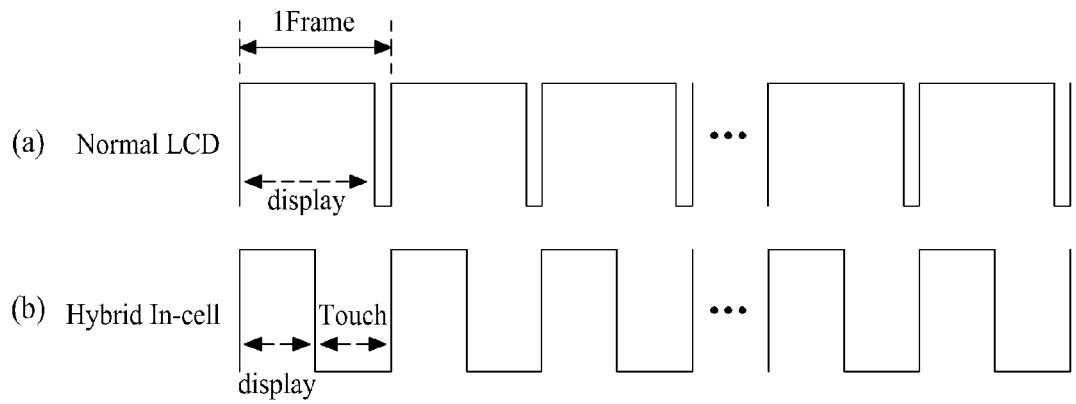
FIG. 3 is various waveform diagrams illustrating an image display period and a touch sensing period in a related art LCD device.
Figure 4:
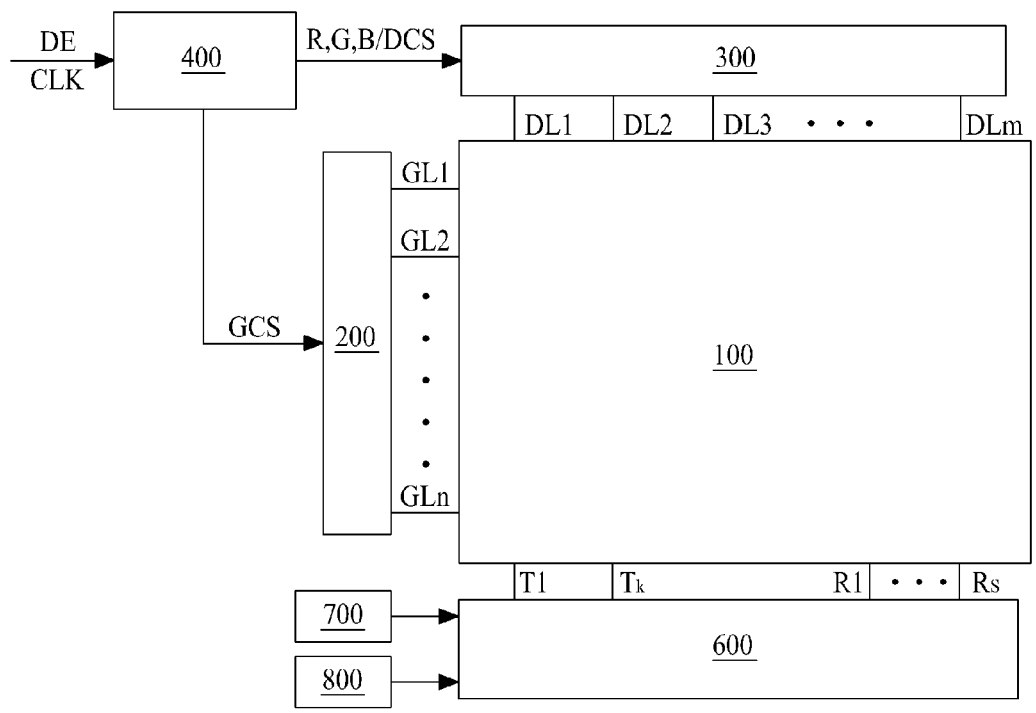
FIG. 4 is an exemplary diagram illustrating a configuration of an LCD device according to an embodiment of the present invention.
Figure 5:
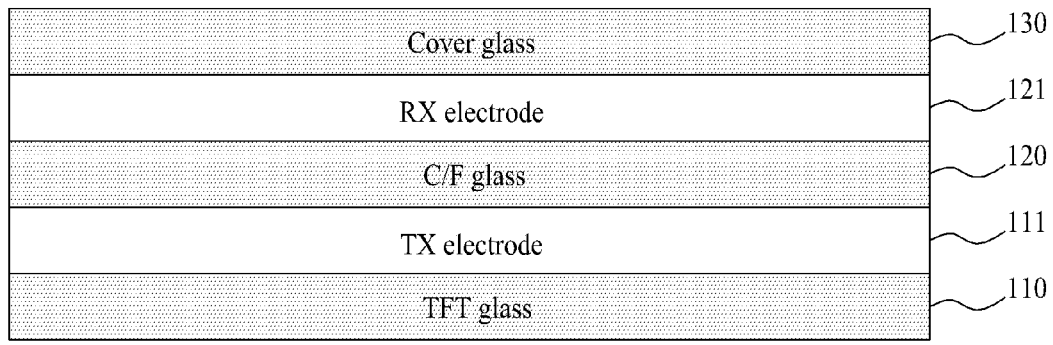
FIG. 5 is an exemplary diagram schematically illustrating a sectional surface of a liquid crystal panel of the LCD device according to the embodiment of the present invention.
Figure 6:
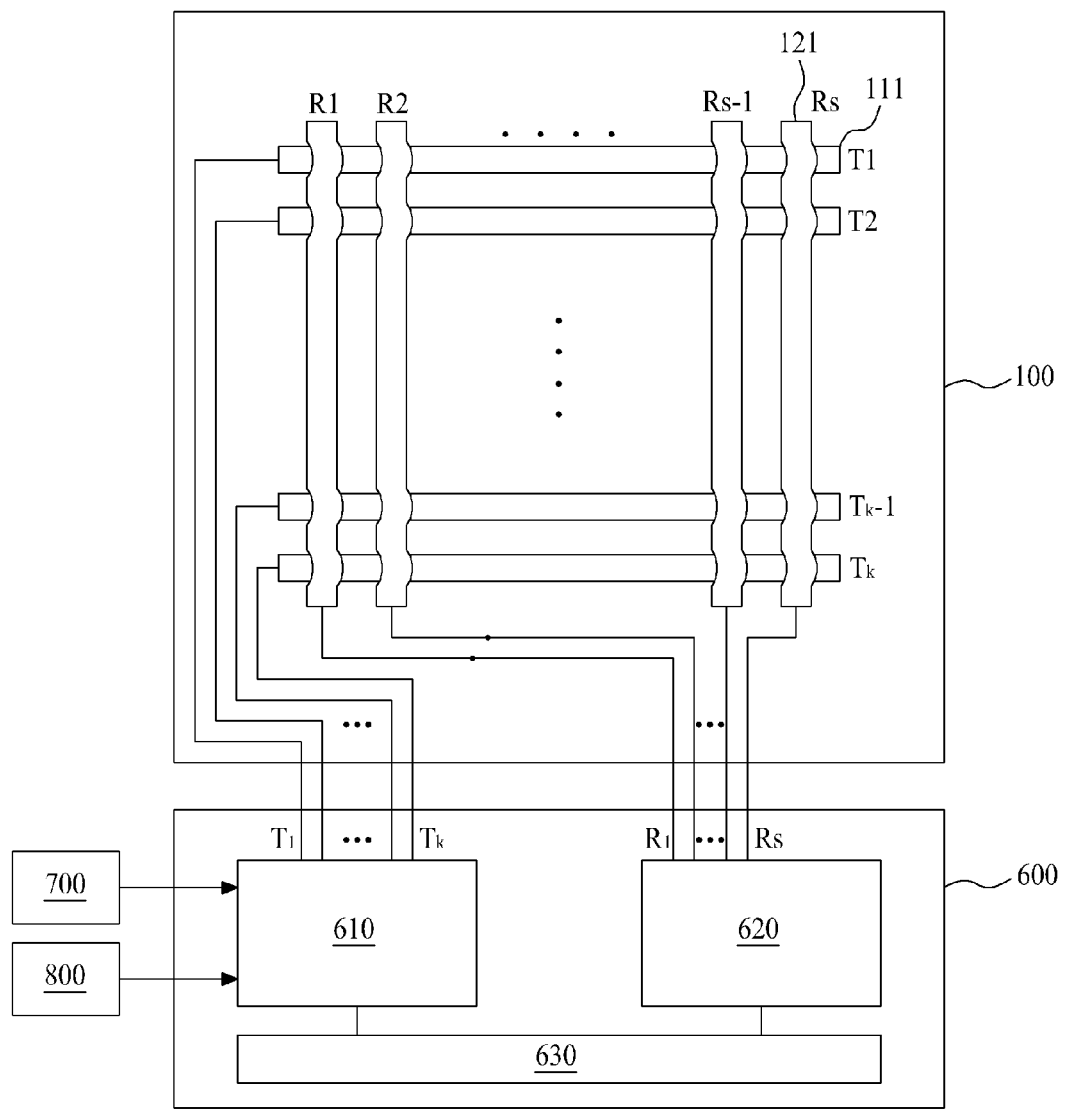
FIG. 6 is an exemplary diagram schematically illustrating configurations of a touch panel and a touch sensing unit applied to the LCD device according to an embodiment of the present invention.

FIG. 4 is an exemplary diagram illustrating a configuration of an LCD device according to an embodiment of the present invention, FIG. 5 is an exemplary diagram schematically illustrating a sectional surface of a liquid crystal panel of the LCD device according to the embodiment of the present invention, and FIG. 6 is an exemplary diagram schematically illustrating configurations of a touch panel and a touch sensing unit 600 applied to the LCD device according to an embodiment of the present invention.

The present invention relates to a hybrid in-cell type LCD device. The present invention sequentially drives a plurality of gate lines for displaying an image and a plurality of driving electrodes for sensing a touch at certain time intervals in a state where the driven gate lines and the driven driving electrodes are spatially separated from each other. That is, in the present invention, the driving of the driving electrodes for sensing a touch does not affect the driving of the gate lines for displaying an image.

To this end, as shown in FIGS. 4 and 5, the LCD device according to the present invention includes a liquid crystal panel 100 with a hybrid in-cell type touch panel built therein, a gate driver 200 applying a scan signal to the gate lines formed in the liquid crystal panel 100, a data driver 300 applying data voltages to a plurality of data lines formed in the liquid crystal panel 100, a timing controller 400 controlling the data driver 300 and the gate driver 200, a common voltage generator 700 applying a common voltage to a driving electrode, a driving voltage generator 800 applying a driving voltage to the driving electrode, and a touch sensing unit 600 applying the driving voltage to the driving electrode of the touch panel and processing a sensing signal received from a receiving electrode of the touch panel to determine whether there is a touch.

First, as shown in FIG. 5, the liquid crystal panel 100 includes a TFT substrate 110 in which a plurality of pixels are respectively formed in a plurality of areas defined by the intersections of the gate lines and the data lines, a color filter substrate 110 in which a color filter is formed, a driving electrode (TX electrode) 111 formed in the TFT substrate 110 or the color filter substrate 120, a receiving electrode (RX electrode) 121 formed in the other surface disposed on the reverse of one surface facing the TFT substrate 110 in the color filter substrate 120, and a cover glass 130 covering the receiving electrode 121.

The touch panel applied to the present invention is a capacitive type touch panel, and particularly, is the hybrid in-cell type touch panel among the on-cell type touch panel, the in-cell type touch panel, and the hybrid in-cell type touch panel described above in the background. As shown in FIGS. 5 and 6, the hybrid in-cell type touch panel applied to the present invention includes a plurality of the driving electrodes 111 (T1 to Tk), which are formed in the TFT substrate 110 or the color filter substrate 120 and are parallel to the gate lines, and a plurality of the receiving electrodes 121 (R1 to Rs), which are formed at an upper end surface of the color filter substrate 120 and are disposed with an insulation layer disposed between the driving electrodes and the receiving electrodes.

One of a first group consisting of the driving electrodes T1 to Tk and a second group consisting of the receiving electrodes R1 to Rs may be disposed in the TFT substrate 110 or the color filter substrate 120. However, in the touch panel shown in FIGS. 5 and 6, the driving electrodes 111 corresponding to the first group are formed in the TFT substrate 110 or the color filter substrate 120, and the receiving electrodes 121 corresponding to the second group are formed in an upper end surface of the color filter substrate 120.

That is, the touch panel applied to the present invention may be built in the liquid crystal panel in various types.

First, the first group of the touch panel may be formed in the TFT substrate 110. Also, the second group of the touch panel may be formed at a second surface disposed on the reverse of a first surface bonded to the TFT substrate 110, in the color filter substrate 120.

Second, the first group of the touch panel may be formed at a first surface bonded to the TFT substrate 110, in the color filter substrate 120, and the second group of the touch panel may be formed at a second surface disposed on the reverse of a first surface, in the color filter substrate 120.

The first and second groups may be formed in various types to be separated from each other with an insulation layer therebetween, in the TFT substrate 110 and the color filter substrate 120. In this case, the driving electrodes 111 configuring the first group are used as the common electrodes applying the common voltage to the liquid crystal panel. A voltage having a certain value may be applied to the receiving electrodes 121 configuring the second group.

Next, the timing controller 400 receives a timing signal, such as the data enable signal DE, the dot clock DCLK, or the like, from an external system to generate the control signals GCS and DCS for controlling an operation timing of the data driver 300 and the gate driver 200. Moreover, the timing controller aligns input video data transferred from the external system to supply aligned video data to the data driver 300.

Moreover, in addition to controlling the data driver 300 and the gate driver 200, the timing controller 400 may generate control signals for controlling an input/output operation timing of the touch sensing unit 600 to control the touch sensing unit 600.

Next, the data driver 300 converts the video data received from the timing controller 400 into analog data voltages, and respectively supplies the data voltages for one horizontal line to the data lines at every one horizontal period where the scan signal is supplied to one gate line. That is, the data driver 300 converts the video data into the data voltages by using gamma voltages supplied from a gamma voltage generator (not shown), and respectively outputs the data voltages to the data lines.

That is, the data driver 300 shifts a source start pulse SSP supplied from the timing controller 400 to generate a sampling signal according to a source shift clock SSC. Furthermore, the data driver 300 latches the video data RGB, which are inputted according to the source shift clock SSC, according to the sampling signal to convert the video data into the data voltage, and then, supplies the data voltage to the data lines in units of a horizontal line in response to a source output enable signal SOE.

To this end, the data driver 300 may include a data sampler, a latch, a digital-to-analog converter, and an output buffer.

Next, the gate driver 200 shifts a gate start pulse GSP transferred from the timing controller 400 to sequentially supply a scan signal having a gate-on voltage Von to the gate lines GL1 to GLn according to a gate shift clock GSC. Furthermore, the gate driver 200 supplies a gate-off voltage Voff to the gate lines GL1 to GLn for a period where a scan signal having the gate-on voltage Von is not supplied to the gate lines GL1 to GLn.

Here, the gate driver 200 applied to the present invention may be manufactured independently from the panel and electrically connected to the panel in various types, but the present invention is not limited thereto. As another example, the gate driver 200 may be provided in the Gate In Panel (GIP) type where the gate driver 200 is mounted into the liquid crystal panel. In this case, the gate control signals controlling the gate driver 200 may be a start signal VST and a gate clock GCLK.

Next, the common voltage generator 700 generates the common voltage supplied to the driving electrodes 111, so as to output an image. The common voltage generated from the common voltage generator 700 is supplied to the driving electrodes 111 through the touch sensing unit 600.

Next, the driving voltage generator 800 generates the driving voltage supplied to the driving electrodes 111, so as to detect a touch. The driving voltage generated from the driving voltage generator 800 is supplied to the driving electrodes 111 through the touch sensing unit 600. The common voltage generator 700 and the driving voltage generator 800 may be integrated into a voltage generating unit. Moreover, the values of the common voltage and the driving voltage may differ, and particularly, the driving voltage for detecting a touch may be greater than the common voltage for displaying an image. In this case, the driving voltage may have a voltage, corresponding to the common voltage, as a low level voltage, and have a voltage greater than the common voltage; as a high level voltage.

Finally, the touch sensing unit 600 as described above detects a user's touch by using the sensing signals (voltage values) received from the receiving electrodes R1 to Rs of the touch panel. That is, when a driving voltage for detecting a touch is applied to the driving electrodes T1 to Tk of the touch panel, by the user touching a specific area of the liquid crystal panel 100 with a finger or a pen, capacitances between the driving electrodes T1 to Tk and the receiving electrodes R1 to Rs are changed, and the capacitance changes effect the changes in voltage values (sensing signals) applied to the touch sensing unit 600 through the receiving electrodes.

The receiving electrodes are is connected to the touch sensing unit 600, and the touch sensing unit 600 determines whether there is a touch, by using the changed voltage values (sensing signals).

The above-described touch sensing unit 600 may be configured to detect only a touch, and in this case, a sensing signal, which is received through the touch sensing unit 600 when a touch is being detected, may be processed in a separate touched position detecting unit (not shown) or the timing controller 400, thereby detecting a touched position. However, the above-described touch sensing unit 600 may be configured to determine whether there is a touch and directly detect a touched position.

The present invention sequentially drives the gate lines for displaying an image and the driving electrodes for sensing a touch at certain time intervals. That is, the present invention drives the driving electrodes, to which the common voltage Vcom for displaying an image and the driving voltage Vd for detecting a touch are supplied, and the gate lines at a certain time interval.

Hereinafter, the internal configuration and function of the touch sensing unit 600 for performing the above-described function will be described in detail with reference to FIGS. 7 and 8.

Figure 7:
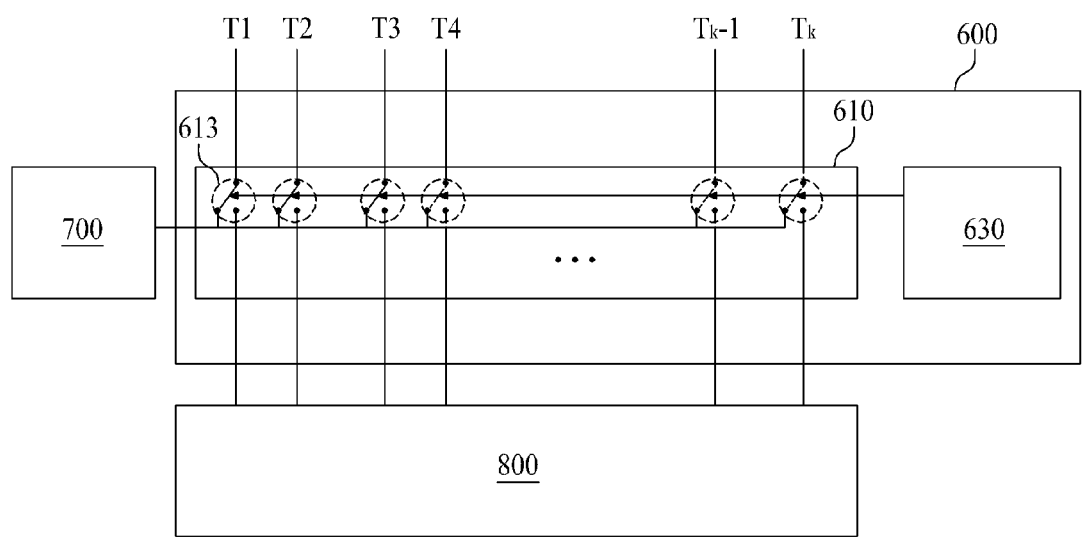
FIG. 7 is an exemplary diagram illustrating a configuration of the touch sensing unit applied to the LCD device according to an embodiment of the present invention.
Figure 8:
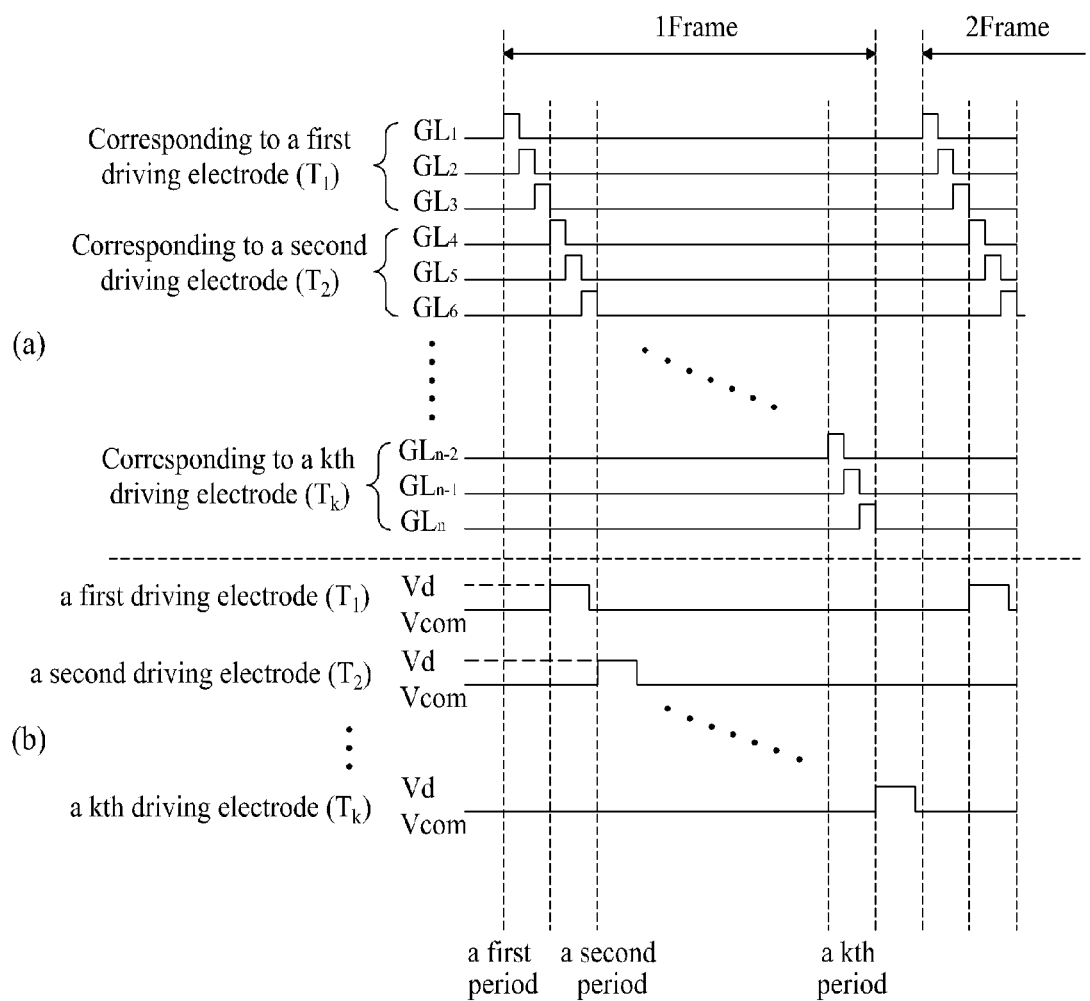
FIG. 8 is an exemplary diagram illustrating waveforms of various signals generated in the LCD device according to an embodiment of the present invention.

FIG. 7 is an exemplary diagram illustrating a configuration of the touch sensing unit applied to the LCD device according to the embodiment of the present invention, and FIG. 8 is an exemplary diagram illustrating waveforms of various signals generated in the LCD device according to the embodiment of the present invention.

The touch sensing unit 600 applied to the present invention supplies the common voltage to the driving electrodes 111. Also, the touch sensing unit 600 sequentially supplies the driving voltage to the driving electrodes corresponding to the gate lines, to which the scan signals are inputted for one frame period, among the driving electrodes, and thus, performs a function of determining whether there is a touch.

Before describing the configuration of the touch sensing unit 600, terms to be described below will be first defined.

First, a scan input gate line denotes a gate line to which the scan signal is being inputted, namely, one gate line to which the scan signal is being inputted, among the gate lines. That is, a plurality of gate lines parallel to a horizontal line of the liquid crystal panel are formed in the liquid crystal panel, and scan signals are sequentially inputted to the gate lines for one frame period.

Second, a scan input driving electrode denotes a driving electrode formed in a position corresponding to the scan input gate line. One driving electrode may be formed in the liquid crystal panel in one-to-one correspondence relationship with one gate line. However, generally, the driving electrode 111 covers a plurality of gate lines. Also, among the driving electrodes, the driving electrode corresponding to a gate line, to which a scan signal is being inputted, is referred to as "scan input driving electrode". Therefore, the common voltage may be continuously inputted to the scan input driving electrode when the scan signal is being sequentially inputted to the gate lines corresponding to the scan input driving electrode.

Third, a scan input switch denotes a switch connected to the scan input driving electrode corresponding to the scan input gate line, namely, one switch which is connected to the scan input driving electrode, among a plurality of switches. That is, in order for the common voltage to be inputted to the scan input driving electrode, the scan input driving electrode needs to be connected to the common voltage generator 700 through the scan input switch.

Fourth, a scanned gate line denotes a gate line to which the scan signal has been already inputted. The scan signal is outputted through the gate line for one horizontal period 1H in one frame period. Therefore, one gate line is referred to as "scan input gate line" for one horizontal period where the scan signal is outputted to the gate line, and is referred to as "scanned gate line" for a period where the scan signal is not outputted to the gate line after the one horizontal period 1H. After one frame, if the scan signal is again inputted to the scanned gate line, the scanned gate line is again referred to as "scan input gate line".

Fifth, a scanned driving electrode denotes a driving electrode corresponding to the scanned gate line. That is, if the scan signal is not inputted to the gate line corresponding to the scan input driving electrode any more, the scan input driving electrode is referred to as "scanned driving electrode". After one frame, if the scan signal is again inputted to the gate line corresponding to the scanned driving electrode, the scanned driving electrode is again referred to as "scan input driving electrode".

Sixth, a scanned switch denotes a switch connected to the scanned driving electrode. That is, one switch may become the scan input switch or the scanned switch based on the above-described principle.

As shown in FIG. 6, the touch sensing unit 600 applied to the present invention includes a switching unit 610 that performs a common voltage transferring operation of connecting the driving electrodes to the common voltage generator 700 and performs a driving voltage transferring operation where the scanned driving electrodes connected to the common voltage generator 700 through the common voltage transferring operation are sequentially connected to the driving voltage generator 800, a touch sync signal generator 630 that generates a touch sync signal for controlling an operation of the switching unit 610, and a sensing signal receiver 620 that determines whether there is a touch by using the sensing signal received from the receiving electrode.

First, as shown in FIG. 7, the switching unit 610 may include a plurality of switches 613 for connecting the driving electrodes T1 to Tk 111 to the common voltage generator 700 or the driving voltage generator 800.

In FIG. 7, the switching unit 610 is illustrated as being connected to only the driving electrodes T1 to Tk 111, but the switching unit 610 may further include a plurality of switches connected to the receiving electrodes R1 to Rs 121. In this case, the switches respectively connected to the receiving electrodes R1 to Rs 121 connect the common voltage generator 700 to the receiving electrodes according to control by the touch sync signal generator 630.

Next, the sensing signal receiver 620 receives a sensing signal, generated with a driving voltage applied to the driving electrode 111, through the switching unit 610 from the receiving electrode 121, and determines whether there is a touch in the touch panel. Here, the determining may mean that the sensing signal receiver 620 determines whether a touch is made or not, or mean that the sensing signal receiver 620 determines whether a touch is made or not and directly determines a touched position.

Finally, the touch sync signal generator 630 generates a touch sync signal for controlling an operation of the switching unit 610.

The touch sync signal generator 630 transfers a second touch sync signal, which allows the scanned driving electrodes to be connected to the driving voltage generator 800, to the scanned switch connected to the scanned driving electrode, and then, the scanned driving electrode is connected to the driving voltage generator 800 by the second touch sync signal. Moreover, as the scanned gate line is sequentially changed, the touch sync signal generator 630 sequentially transfers the second touch sync signal to the scanned switches connected to the scanned driving electrode corresponding to the changed scanned gate line. That is, the touch sync signal generator 630 sequentially transfers the second sync signal to the scanned switches connected to the scanned driving electrodes intended to receive the driving voltage.

Also, the touch sync signal generator 630 transfers a first touch sync signal, which allows the driving electrodes (connected to the switches to which the second touch sync signal is not inputted) to be connected to the common voltage generator 700, to the switches to which the second touch sync signal is not inputted, and then the driving electrodes, connected to the switches to which the second touch sync signal is not inputted, are connected to the common voltage generator 700 by the first sync signal. The scan input driving electrode and the scanned driving electrode may be included in the driving electrodes connected to the common voltage generator 700 by the first touch sync signal, and the driving electrodes, to which the scan signal is not yet inputted for one frame period, may also be included in the driving electrodes connected to the common voltage generator 700 by the first touch sync signal. That is, the first touch sync signal is transferred to the switches connected to the driving electrodes other than the driving electrodes connected to the driving voltage generator 800 for detecting a touch, among the every driving electrode.

Hereinafter, a method of driving the LCD device including the above-described elements will be described with reference to FIG. 8. As described above, each of the driving electrodes T1 to Tk may be formed to correspond to at least one gate line. In FIG. 8, particularly, one driving electrode is formed in the liquid crystal panel to correspond to three gate lines, and thus, the panel illustrated in FIG. 8 will be described below as an example of the present invention. That is, as shown in FIGS. 6 and 8, first to kth driving electrodes T1 to Tk are formed in the liquid crystal panel or the touch panel, the first driving electrode T1 is formed to correspond to first to third gate lines GL1 to GL3, and the kth driving electrode Tk is formed to correspond to n-2th to nth gate lines GLn-2 to GLn.

A method of driving a LCD device according to the present invention is divided into two steps.

In a first step, a common voltage is applied to the driving electrodes 111, which are formed in the liquid crystal panel 100 in parallel to the gate lines, for one frame period. In a second step, driving voltages are sequentially applied to scanned driving electrodes corresponding to scanned gate lines among the driving electrodes to detect a touch while the common voltage is applied to the driving electrodes through the first step.

The first step is a step of applying a common voltage, and in the first step, as described above, a common voltage is applied to all of the driving electrodes. That is, a common voltage is continuously supplied to all of the driving electrodes, and in the second step to be described below, a driving voltage is applied to only a specific driving electrode from which a touch is detected.

The second step is a step of detecting a touch, and is subdivided into the following steps.

The step of detecting a touch denotes a step that determines whether there is a touch by using a sensing signal received from the receiving electrodes formed on the driving electrodes with an insulation layer therebetween, according to a driving voltage applied from the driving electrodes.

First, in the step of detecting a touch, scan signals are supplied to first to third gate lines for a first period, when a common voltage Vcom1 is being supplied to a first driving electrode T1 corresponding to the first to third gate lines GL1 to GL3, and then, as shown in a portion (b) of FIG. 8, a driving voltage Vd for detecting a touch is supplied to the first driving electrode T1 (a first scanned driving electrode) corresponding to the first to third gate lines for a second period. However, the present invention is not limited thereto. Therefore, common voltages are sequentially supplied to first to sixth gate lines, and then, a driving voltage may be supplied to the first driving electrode, or common voltages are sequentially supplied to first to ninth gate lines, and then, a driving voltage may be supplied to the first driving electrode.

Next, while scan signals are sequentially supplied to first to nth gate lines, driving voltages are sequentially supplied to scanned driving electrodes corresponding to the first to nth gate lines.

That is, as shown in FIG. 8, while scan signals are sequentially supplied to first to third gate lines GL1 to GL3 for the first period, the touch sensing unit 600 supplies the common voltage Vcom to the first driving electrode T1 (a first scan input driving electrode). Also, while scan signals are sequentially supplied to fourth to sixth gate lines GL4 to GL6 for the second period, the touch sensing unit 600 supplies the driving voltage Vd to the first driving electrode T1 (a first scanned driving electrode).

Moreover, while scan signals are sequentially supplied to seventh to ninth gate lines GL7 to GL9 not shown for a third period, the touch sensing unit 600 supplies the driving voltage Vd to the second driving electrode T2 (a second scanned driving electrode).

Therefore, while scan signals are sequentially supplied to n-2nd to nth gate lines GLn-2 to GLn for a kth period, the touch sensing unit 600 supplies the driving voltage Vd to a k-1th driving electrode Tk-1 (a k-1st scanned driving electrode). Also, after a scan signal is supplied to a nth gate line GLn, the touch sensing unit 600 supplies the driving voltage Vd to a kth driving electrode (a kth scanned driving electrode). Here, because the time when a scan signal is supplied to the nth gate line GLn is a last time of a first frame, the driving voltage supplied to the kth driving electrode corresponding to the nth gate line may be supplied to the kth driving electrode for a vertical blank period between the first frame and a second frame. However, a period from the time when the driving voltage is supplied to the first driving electrode to the time when the driving voltage is supplied to the kth driving electrode may be denoted as the first frame.

As described above, the gate lines, to which the scan signals for displaying an image are supplied, and the scanned driving electrodes, to which the driving voltage is supplied, are sequentially driven, with a spatial distance between the gate lines and the scanned driving electrodes being maintained.

Moreover, as shown in a portion (b) of FIG. 8, the common voltage Vcom is supplied to the driving electrode for every period except a period for which the driving voltage Vd for detecting a touch is supplied to the driving electrode.

As described above, the present invention relates to a hybrid in-cell type LCD device, and supplies a scan signal for displaying an image and a driving voltage for detecting a touch to a panel at predetermined time intervals. That is, the present invention maintains a constant timing when the scan signal is inputted to the gate line or the common voltage is inputted to the driving electrode, and maintains a constant timing when the driving voltage is inputted to the driving electrode, in which case the driving electrode receiving the scan signal does not overlap the driving electrode receiving the driving voltage.

According to the above-described present invention, when a liquid crystal panel having the same sectional surface as that of a liquid crystal panel of a related art hybrid in-cell type LCD device is used, it is possible to perform a touch sensing function without time division.

Moreover, the present invention may be applied to hybrid in-cell type LCD devices having various structures in which the receiving electrode 121 does not affect an operation of displaying an image.

According to the embodiment of the present invention, by sequentially driving the driving electrodes for sensing a touch at a certain time interval from the driving period of the gate lines when the gate lines are being sequentially driven, the hybrid in-cell type touch panel can be driven regardless of the resolution and size of the liquid crystal panel.

That is, the present invention can drive the touch panel and the liquid crystal panel without time division when the hybrid in-cell type touch panel is used, save the additional cost by removing a time-division scheme, and secure a sufficient driving time by simultaneously performing the image output function and the touch sensing function, thus enhancing the image output function and the touch sensing function.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device, comprising:
   a liquid crystal panel configured to comprise a TFT substrate and a color filter substrate which are coupled to each other with a liquid crystal layer therebetween;
   a touch panel configured to comprise a plurality of driving electrodes formed in parallel to a plurality of gate lines formed in the liquid crystal panel and a plurality of receiving electrodes formed on the driving electrodes with an insulation layer therebetween, and detect a touch, at least one of a first group consisting of the driving electrodes and a second group consisting of the receiving electrodes being formed in the TFT substrate or the color filter substrate;
   a common voltage generator configured to generate a common voltage;
   a touch sensing unit configured to:
      supply the common voltage to the driving electrodes; and
      sequentially supply a driving voltage to only scanned driving electrodes of the plurality of driving electrodes; and
   a driving voltage generator configured to generate the driving voltage,
   wherein each of the scanned driving electrodes corresponds to at least two scanned gate lines to which a scan signal has been inputted for one frame period,
   wherein the at least two scanned gate lines corresponding to one of the scanned driving electrodes are adjacent to each other,
   wherein the driving electrodes are configured as:
      common electrodes to which the common voltage is supplied, and
      the touch panel to which the driving voltage is supplied,
   wherein the touch sensing unit simultaneously supplies the driving voltage to only the scanned driving electrodes for a period within the one frame period and the common voltage to the remaining driving electrodes,
   wherein the one frame period includes an image display period for which an image voltage is outputted and a blank period for which an image voltage is not outputted, and
   wherein the driving voltage and the common voltage are supplied during the image display period.

2. The LCD device of claim 1, wherein:
   the first group is formed in the TFT substrate, and the second group is formed at a second surface disposed on the reverse of a first surface bonded to the TFT substrate, in the color filter substrate; or
   the first group of the touch panel is formed in a first surface bonded to the TFT substrate, in the color filter substrate, and the second group is formed in a second surface disposed on the reverse of the first surface, in the color filter substrate.

3. The LCD device of claim 1, wherein the touch sensing unit comprises:
   a switching unit configured to:
      perform a common voltage transferring operation that connects the driving electrodes to the common voltage generator; and
      perform a driving voltage transferring operation where the scanned driving electrodes, connected to the common voltage generator through the common voltage transferring operation, are sequentially connected to the driving voltage generator;
   a touch sync signal generator configured to generate a touch sync signal for controlling an operation of the switching unit; and
   a sensing signal receiver configured to determine whether there is a touch by using the sensing signal received from the receiving electrode.

4. The LCD device of claim 3, wherein the switching unit comprises a plurality of switches configured to connect the driving electrodes to the common voltage generator or the driving voltage generator.

5. The LCD device of claim 4, wherein:
   the touch sync signal generator is further configured to:
      sequentially transfer a second touch sync signal, which allows the scanned driving electrodes to be connected to the driving voltage generator, to scanned switches connected to the scanned driving electrodes corresponding to the scanned gate lines, among the switches; and
      transfer a first touch sync signal, which allows the driving electrodes connected to the switches to be connected to the common voltage generator, to the switches; and
   the second touch sync signal is not inputted to the switches.

6. The LCD device of claim 4, wherein the switching unit further comprises a plurality of switches, each of which is connected to the receiving electrode.

7. The LCD device of claim 6, wherein each of the plurality of switches is configured to connect the receiving electrode to the common voltage generator or the sensing signal receiver.

8. The LCD device of claim 1, wherein the receiving electrodes are configured as common electrodes to which the common voltage are supplied and for transferring sensing signals to the touch sensing unit.

9. The LCD device of claim 1, wherein:
   the driving voltage has a voltage, corresponding to the common voltage, as a low level voltage; and
   the driving voltage has a voltage greater than the common voltage as a high level voltage.

10. The LCD device of claim 1, wherein the common voltage is continuously supplied to the driving electrode for every period, except a period for which the driving voltage is supplied to the driving electrode.

11. The LCD device of claim 1, wherein:
in a first period within the one frame period, the common voltage is supplied to a first driving electrode while the scan signal is sequentially inputted into each gate line of the at least two scanned gate lines corresponding to the first driving electrode, and
in a second period within the one frame period, the driving voltage is supplied to the first driving electrode while the corresponding at least two scanned gate lines do not receive the scan signal.

12. The LCD device of claim 11, wherein, in the second period within the one frame period, the scan signal is sequentially inputted into each gate line of the at least two scanned gate lines corresponding to a second driving electrode to which the common voltage is supplied.

13. A method of driving a liquid crystal display (LCD) device, the method comprising:
supplying a common voltage to driving electrodes formed in parallel to gate lines in a liquid crystal panel; and
sequentially supplying a driving voltage to only scanned driving electrodes of the plurality of driving electrodes to detect a touch while the common voltage is supplied to the driving electrodes,
wherein each of the scanned driving electrodes corresponds to at least two scanned gate lines to which a scan signal has been inputted for one frame period,
wherein the at least two scanned gate lines corresponding to one of the scanned driving electrodes are adjacent to each other,
wherein the driving electrodes are configured as:
common electrodes to which the common voltage is supplied, and
a touch panel to which the driving voltage is supplied,
wherein the touch sensing unit simultaneously supplies the driving voltage to only the scanned driving electrodes for a period within the one frame period and the common voltage to the remaining driving electrodes,
wherein the one frame period includes an image display period for which an image voltage is outputted and a blank period for which an image voltage is not outputted, and
wherein the driving voltage and the common voltage are supplied during the image display period.

14. The method of claim 13, wherein:
the driving voltage has a voltage, corresponding to the common voltage, as a low level voltage; and
the driving voltage has a voltage greater than the low level voltage as a high level voltage.

15. The method of claim 14, wherein:
each of the driving electrodes is formed in the liquid crystal panel in correspondence with at least two or more gate lines; and
the common voltage is continuously supplied to the driving electrode for every period except a period for which the driving voltage is supplied to the driving electrode.

16. The method of claim 14, wherein the detecting of a touch comprises:
supplying a driving voltage to a driving electrode corresponding to a first scanned gate line for one frame period;
sequentially supplying a driving voltage to driving electrodes corresponding to second to $n^{th}$ scanned gate lines for the one frame period; and
detecting a touch by using receiving signals received from the driving electrodes.

17. The method of claim 13, wherein the detecting of a touch comprises determining whether there is a touch by using a sensing signal received from the receiving electrodes formed on the driving electrodes with an insulation layer therebetween, according to a driving voltage applied to the driving electrodes.

18. The LCD method of claim 13, wherein:
in a first period within the one frame period, the common voltage is supplied to a first driving electrode while the scan signal is sequentially inputted into each gate line of the at least two scanned gate lines corresponding to the first driving electrode, and
in a second period within the one frame period, the driving voltage is supplied to the first driving electrode while the corresponding at least two scanned gate lines do not receive the scan signal.

19. The method device of claim 18, wherein, in the second period within the one frame period, the scan signal is sequentially inputted into each gate line of the at least two scanned gate lines corresponding to a second driving electrode to which the common voltage is supplied.

* * * * *